United States Patent

[11] 3,599,545

| [72] | Inventors | Helmut Durr;<br>George Klepek; Rainer Vesper, all of Munich, Germany |
|---|---|---|
| [21] | Appl. No. | 8,187 |
| [22] | Filed | Feb. 3, 1970 |
| [45] | Patented | Aug. 17, 1971 |
| [73] | Assignee | Agfa-Gevaert Aktiengesellschaft<br>Leverkusen, Germany |
| [32] | Priority | Feb. 6, 1969 |
| [33] | | Germany |
| [31] | | P 19 05 842.5 |

[54] PHOTOGRAPHIC CAMERS WITH ELECTRONIC EXPOSURE CONTROL
15 Claims, 3 Drawing Figs.

[52] U.S. Cl. .................................................. 95/10 C, 356/235
[51] Int. Cl. .................................................. G01j 1/08, G01j 1/44, G03b 7/02
[50] Field of Search .................................. 95/10 C; 356/218, 227, 230, 235

[56] References Cited
UNITED STATES PATENTS

| 2,163,205 | 6/1939 | Leber | 356/235 |
| 2,195,640 | 4/1940 | Bing | 356/235 |
| 2,354,545 | 7/1944 | Rath | 356/235 |
| 2,771,000 | 11/1956 | Creelman | 356/230 |
| 3,436,158 | 4/1969 | Schmitt | 95/10 (C) X |
| 3,460,450 | 8/1969 | Ogihara | 95/10 (C) |
| 3,532,035 | 10/1970 | Fujii et al. | 95/10 (C) |

*Primary Examiner*—Joseph F. Peters, Jr.
*Attorney*—Michael S. Striker

ABSTRACT: A photographic camera with electronic exposure control and an exposure time indicator. A time scale is arranged along the length of an elongated light source which provides light at uniform intensity and as a function of the brightness condition prevailing at the object to be photographed. The light intensity of the source is varied through a photosensitive element in the electronic exposure control unit. A light attenuating member in the form of a wedge-shaped element in front of the light source extends along the length of the timing scale and provides attenuation which varies continuously in a progressive manner from one end of the wedge-shaped element to the other. A glass member with interference layers and illuminated from an auxiliary light source, is arranged to provide more precise indicating results.

PATENTED AUG 17 1971

INVENTOR
HELMUT DÜRR
GEORG KLEPEK
RAINER VESPER

_3,599,545_

PHOTOGRAPHIC CAMERS WITH ELECTRONIC EXPOSURE CONTROL

BACKGROUND OF THE INVENTION

The present invention resides in a photographic camera with an electronic exposure control arrangement and with a device used to indicate the exposure time.

It is already well known in the art to indicate, for example, the exposure time in a photographic camera, with the aid of a measuring instrument. In such conventional arrangements, the measuring instrument is in series with a light-sensitive element. Such a exposure indicating arrangement with a measuring instrument, however, has the disadvantage that it is considerably costly and subject to shock.

Accordingly, it is an object of the present invention to provide an electronic exposure control arrangement for photographic cameras, which does not possess a measuring instrument. It is also the object of the present invention to provide such an electronic exposure control arrangement which is of simple design and construction and which indicates the exposure time.

In accordance with the present invention, the objects are achieved by providing a time scale within preferably the finder of the camera, and arranging in conjunction with this time scale, a light source of uniform intensity. The light intensity of this source is made dependent upon the prevailing light conditions, and the length of the light source is made to correspond the measured length of the timing scale. A light attenuating element which has the characteristic of increasing the light attenuation from one of its ends to the other, is located in front of the light source. Through this light attenuation element, the light from the uniform source becomes continuously attenuated along the longitudinal direction of the element. Depending upon the prevailing intensity of the light from the object to be photographed, a band of light of predetermined length is visible upon the attenuating element. The characteristic region of the light source is used so that a linear dependency or function is realized between the light intensity and the electrical current applied to the light source.

In accordance with a further embodiment of the present invention, the light source consists of at least two lamps and a diffusing plate along the length of the time scale. The diffusing plate serves to provide for substantially uniform light distribution.

In a further development of the light source, the latter is constructed in the form of a lamp and a light rod which is arranged parallel to the light attenuating element.

It is also possible, however, to construct and design the light source in the form of a rod provided with a diffusing layer, so that a diffused lamp may be realized.

From an advantageous viewpoint, the attenuating element exhibits a continuously increasing light attenuation characteristic, and is designed or shaped in the form of a gray or Goldberg wedge. It is also possible, however, to provide the light attenuating element with a stepwise function of increasing light attenuation, corresponding to the scale subdivision or graduation.

In accordance with a further embodiment, the timing scale is arranged in front of the light attenuating element, so that for a predetermined light intensity of the light source, a band of light of predetermined length becomes visible upon the timing scale. The moving or flowing border between the light band and the dark portion of the element serves as the marking for the expected exposure time.

It is, however, also possible to arrange the timing scale above or below the light attenuating element. In that event, the timing scale becomes illuminated with constant light intensity through an auxiliary light source. Thus, the length of the light band visible upon the light attenuating element may be compared, in the manner, with the illuminated timing scale, in an advantageous manner.

In accordance with a further embodiment, the light intensity of the light source is varied through a photosensitive element in the exposure control arrangement.

In order to provide for sharper contrast in the changeover from the bright region to the dark region of the light band, a glass plate with interference layers is provided in front of the light source and the light attenuating element which is illuminated from the light source. The glass plate is illuminated from a constant auxiliary light source, so that at the location of the interference layer of the glass plate, a change in color takes place where the two illuminating intensities from both light sources are equal. If, for example, the light intensity of the light source behind the attenuating element or gray wedge is greater than the light intensity originating from the auxiliary light source upon the glass plate, the viewer or observer will see, for example, the color red. At the location at which both illuminating intensities are equal, a color change takes place, so that in the further region in which the light intensity of the auxiliary source is greater than that derived from the source which is attenuated by the wedge, the viewer will see the color green, for example.

SUMMARY OF THE INVENTION

A photographic camera with an electronic exposure control unit and an exposure time indicator. The finder of the camera contains a timing scale and a uniform light source which is elongated in length corresponding to the length of the scale. The brightness or light intensity of the elongated source is made dependent upon the brightness conditions prevailing at the object to be photographed, through a photosensitive element which is connected in series with the light source. A light attenuating element in the form of a wedge-shaped structure extends along the length of the light source and attenuates progressively the light from the source. The wedge-shaped element is such that it has a characteristic through which the attenuating property extends increasingly from one end of the element to the other. The indicating characteristics of the arrangement may be made more precise by providing a glass plate with interference layers and a separate or auxiliary light source which illuminates the glass plate. The glass plate is arranged so that it is subjected to this auxiliary light source and the first-mentioned light source. At a location where the two light sources impinging upon the glass plate are of equal intensity, a changeover in color takes place, and it is possible to obtain a reading in a substantially precise manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
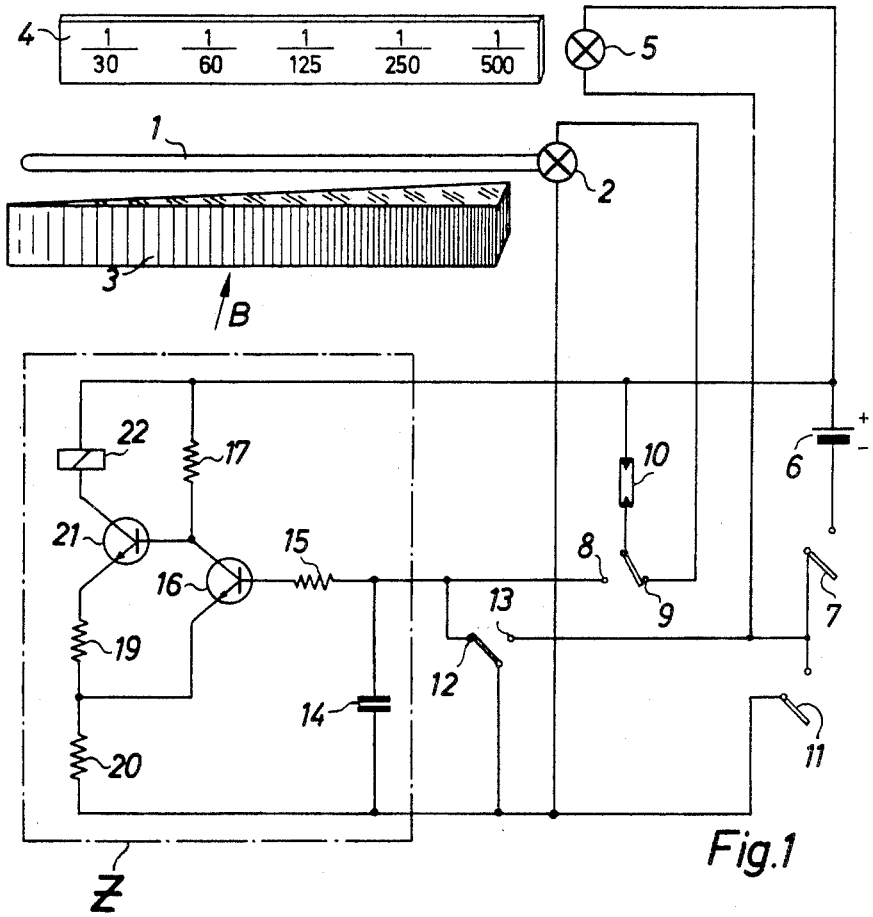
FIG. 1 is a functional and electrical schematic diagram and shows the electronic control arrangement, in accordance with the present invention.

Referring to the drawing, and in particular to FIG. 1, a light conductive rod 1 is provided within the finder of the apparatus, not shown. A lamp 2 is situated at one end of the light rod 1. When viewed from the direction designated by the arrow B, a gray wedge, Goldberg wedge, or gray scale 3 is located in front of the light rod 1. The wedge or gray scale 3 attenuates continuously the light which is homogeneously emitted from the light rod 1, along the longitudinal direction thereof. A time scale 4 is arranged above the wedge 3. This time scale 4 is illuminated through auxiliary lamps 5. The lamp 5 is connected, with one of its terminals, to the positive terminal of a voltage source 6, whereas the other terminal of the lamp 5 is connected to an operating switch 7 which, in turn, has a fixed contact connected to the negative terminal of the voltage source 6. One terminal of the lamp 2 is connected to a fixed contact 9 of a switch having its movable contact connected in series with a photoresistor 10. The other terminal of the lamp 2 is connected to a release switch 11 which may be connected to the operating switch 7 and thereby with the negative terminal of the voltage source 6.

The release switch 11 is, furthermore, bridged by a switch having contacts 12 and 13. In the quiescent or inoperative state of the arrangement, the switching contact 12 short circuits the capacitor 14 of the timing control unit. This short circuit is removed when forming the exposure time, and the photoresistor 10 is connected in series with the capacitor 14. When the photoresistor 10 is thus connected to the capacitor 14, it is also connected to the junction of the resistor 15 and capacitor 14. The resistor 15 is, in turn, connected to the base of a transistor 16 which has a collector resistance 17. The emitter of the transistor 16 is connected to the junction of two resistors 19 and 20 which lie in the emitter circuit of a second resistor 21. An electromagnet 22 is connected in series with the collector circuit of the transistor 21. This electromagnet 22 or solenoid 22, produces closure of the shutter after a predetermined time interval determined by the timing network of photoresistor 10 and capacitor 14.

After actuating the operating switch 7 through a release button, not shown, and after actuation of the switch 11, the lamp 5 becomes lit. As a result, the scale 4 becomes illuminated with constant light intensity. Aside from this, the lamp 2 is also illuminated with a light intensity or brightness determined through the resistance value of the photoresistor 10. With the lighting of the lamp 2, a band of light appears upon the wedge 3, and the length of this band is dependent upon the brightness or light intensity of the lamp 2. The length of this band of light may be compared with the time scale 4. The moving border between "bright" and "dark" of the light band, shows the set exposure time.

The switch with contacts 8 and 9 is mechanically coupled to the release mechanism or release button, in a manner not shown. Upon further actuation of the release button, thereby, the switch with these contacts 8 and 9 becomes actuated and switches on, in a preparatory manner, the timing control circuit. The photoresistor 10 is connected in series with the capacitor 14, in the conventionally known manner. After disconnecting from the switching contact 9, the lamp 2 becomes extinguished. If the shutter is set and the shutter blades or lammela begin to open, in a manner not shown, then the switch with contacts 12 and 13 becomes actuated. The time generating arrangement commences, thereby, to function. After elapse of a period of time determined through the time constants of the timing network with components 10 and 14, the electromagnet 22 permits the closure of the shutter blades.

Figure 2:
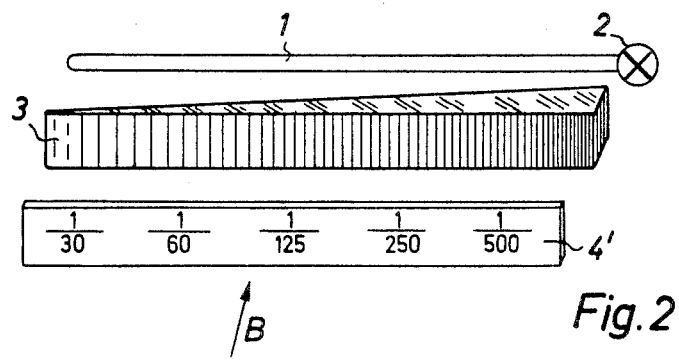
FIG. 2 is another embodiment of the arrangement of FIG. 1.

In accordance with FIG. 2, the wedge 3 is arranged in association with the timing scale 4'. The light rod 1 is located similar to that of the arrangement shown in FIG. 1, and is behind the wedge 3 when viewing from the direction denoted by the arrow B. The lamp 2 is, similarly, functionally associated with the photoresistor as in FIG. 1. In the embodiment of FIG. 2, the lamp 5 for illuminating the timing scale is omitted. The band of light on the wedge 3 may be seen directly through the timing scale, and the exposure time may be read directly therefrom.

Figure 3:
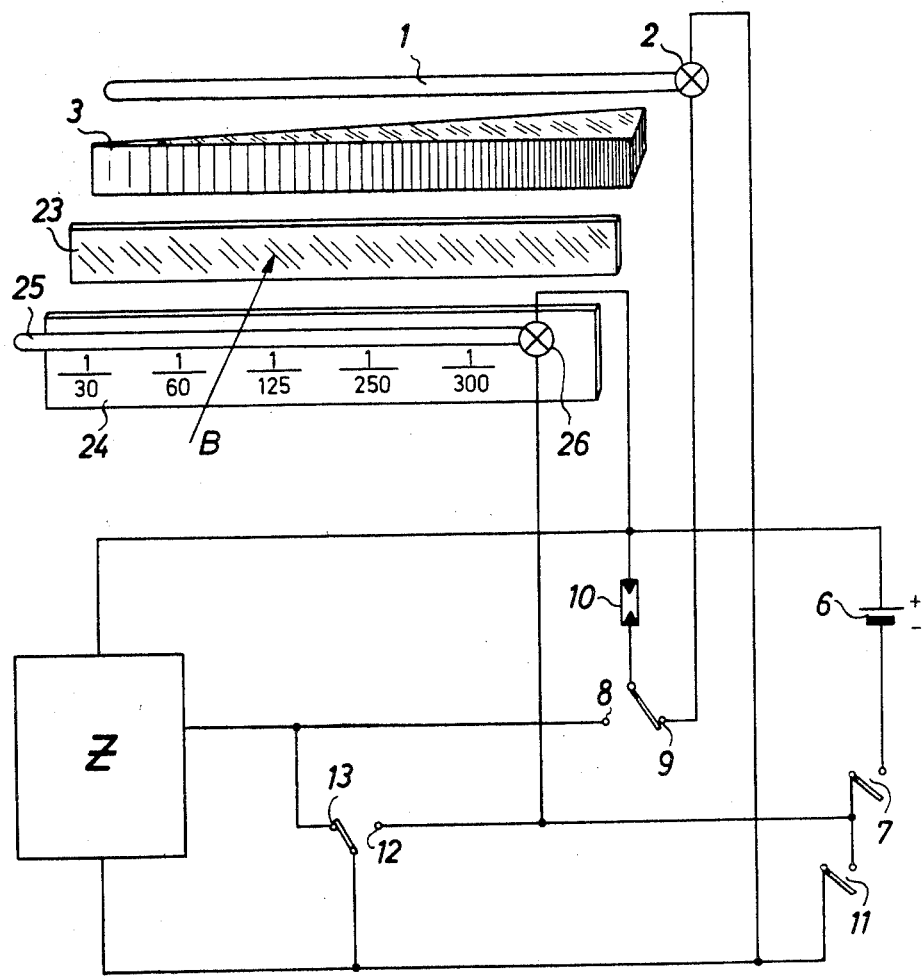
FIG. 3 is a still further embodiment of the arrangement of FIG. 1.

In the embodiment of FIG. 3, a glass plate 23 with interference layers is used to realize sharper visibility of the border of the band of light. This glass plate 3 provided with the interference layers is in front of the attenuating wedge 3 when viewed in the direction denoted by the arrow B. The wedge 3 also serves here the purpose of attenuating the light emanated from the light rod 1.

Below the glass plate 23, a timing scale 24 is located. The glass plate 23 is illuminated, in the viewing direction, by light originating from the light rod 25 and the lamp 26. The light source made of the light rod element 25 and lamp 26 maintains constant light output, since this light source is directly connected to the voltage source 6. The remaining circuit element in the embodiment of FIG. 3 corresponds to those of FIG. 1. For purposes of simplicity, the exposure control arrangement of FIG. 1, is denoted by the symbol or block Z in FIG. 3. Thus, the box designated Z in FIG. 3, contains all of the circuit elements within the circuit portion outlined through dash-dot-lines in FIG. 1.

Upon actuation of the operating switch 7 and the release switch 11, the lamps 2 and 26 become lighted, so that the lamp 26 illuminates the glass plate 23 with interference layer. This illumination of the glass plate 23 is carried out with constant light intensity through the light rod 25. The light originating from the source comprised of the lamp 2 and rod 1, however, is influenced through the photoresistor 10, and becomes attenuated continuously from one end to the other end through the wedge 3. A viewer will see a predetermined color as, for example, green, when within a region of the interference layer of the glass plate the light from the source comprised of elements 1 and 2 and attenuated by the wedge 3, has a greater intensity than the light from the source comprised of elements 25 and 26. At the location on the glass plate where both light intensities are equal, a color change takes place. Thus, within the region of the interference layer of the glass plate, in which a portion of the light from the source 25, 26 is greater than that realized from the other light source, another color as, for example, red may be seen. Through the use of a glass plate with interference layers, consequently, the advantage is realized that through the relatively small region of color change, a more precise readout for the set exposure time, may be realized in comparison with the precision available from the preceding embodiments.

The present invention is not limited to the embodiments illustrated. Thus, the timing scale, the wedge, and the interference layer/glass plate can, for example, be arranged behind a separate camera window or opening.

It will be understood that each of the elements described above, or two or more together, may also find a useful application in other types of constructions differing from the types described above.

While the invention has been illustrated and described as embodied in electronic exposure controls for photographic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint or prior art, fairly constitute essential characteristics of the generic or specific aspects of this invention and, therefore such adaptations should and are intended to be comprehended within the meaning and range of equivalence of the following claims.

What I claim as new and desire to be protected by Letters Patent is set forth in the appended claims.

1. A photographic camera with electronic exposure control means comprising, in combination, at least one uniform elongated light source with light intensity dependent on the brightness condition prevailing at the object to be photographed; scale means in proximity to said light source and extending in length corresponding to the length of said light source; and light attenuating means in front of said light source and extending substantially along the length of said light source, said attenuating means having an attenuating characteristic varying along the length of said attenuating element.

2. The photographic camera as defined in claim 1 including indicating means for indicating the exposure time.

3. The photographic camera as defined in claim 1 wherein said light source and said scale means as well as said light attenuating means are within the finder of said camera.

4. The photographic camera as defined in claim 1 wherein said attenuating characteristic varies increasingly from one end of said light attenuating means to the other end thereof.

5. The photographic camera as defined in claim 1 wherein said light source comprises at least two lamps and diffusing surface means corresponding to the length of said scale means.

6. The photographic camera as defined in claim 1 wherein said light source comprises a lamp and light rod means arranged parallel to said light attenuating means.

7. The photographic camera as defined in claim 1 wherein said light source comprises a rod-shaped diffused lamp.

8. The photographic camera as defined in claim 1 wherein said light attenuating means comprises a wedge-shaped element with continuously varying light attenuation characteristics.

9. The photographic camera as defined in claim 1 wherein said light attenuating means comprises a wedge-shaped element having light attenuation characteristic varying in a stepwise manner along said wedge-shaped element.

10. The photographic camera as defined in claim 1 wherein said scale means is located in front of said light attenuating means.

11. The photographic camera as defined in claim 1 wherein said scale means is arranged above said light attenuating means.

12. The photographic camera as defined in claim 1 wherein said scale means is arranged below said light attenuating means.

13. The photographic camera as defined in claim 1 including auxiliary light source means for illuminating said scale means with constant light intensity.

14. The photographic camera as defined in claim 1 including photosensitive means within said electronic exposure control means and connected to said light source means for varying the intensity of light from said light source as a function of said brightness condition prevailing at said object to be photographed.

15. The photographic camera as defined in claim 1 including glass means with interference layers in proximity to said light attenuating means; a source of auxiliary light for illuminating said glass means so that a change in visible color takes place on said glass means at a location of said glass means where the light intensity from said elongated light source and said auxiliary source of light are equal in light intensity.